UNITED STATES PATENT OFFICE 2,290,602

RECOVERY OF PHENOLS AND OLEFINS

Donald R. Stevens, Swissvale, and Joseph B. McKinley, Pittsburgh, Pa., assignors to Gulf Research & Development Company, Pittsburgh, Pa., a corporation of Delaware No Drawing. Application November 27, 1939, Serial No. 306,412

9 Claims. (Cl. 260—621)

This invention or discovery relates to the recovery of phenols and olefins; and it comprises a method of recovering phenols and olefins from alkylated phenols carrying three or more carbon atoms in at least one side chain wherein said alkylated phenols are dealkylated by heating in the presence of one or more alkyl sulfuric acid esters thereby splitting off the alkyl side chain from the phenolic nucleus with formation of mono-olefins with little or no polymerization; all as more fully hereinafter set forth and as claimed.

Various alkylated phenols are technically available from which it is desirable to produce simpler phenols and an olefin group without any far-going polymerization or molecular change in the olefin produced. In particular such alkylated phenols are an intermediate product in methods of separating isomeric phenols, such as cresols, with not much difference in boiling point. By alkylating one or both phenols, reaction mixtures are produced which may be easily separated by fractional distillation. Afterwards it is in general desirable to dealkylate and recover the original phenol or phenols.

Under the present invention from such alkylated starting materials, it is possible to produce substantially pure phenols and olefins, particularly branched chain olefins, such as isobutylene and isoamylene. Good yields are obtained both of the phenol and of the olefin.

For the present purposes it is desirable to use a catalyst which, while aiding in the splitting off of the side chain, does not catalyze or promote the formation of undesirable polymers and oxidation products. Necessarily the catalyst must be stable and should not react with the products of dealkylation to form undesirable compounds. Such a catalyst is afforded by an alkyl sulfuric acid ester, or a mixture of such esters.

Dealkylation of alkylated phenols has heretofore been effected by heating in the presence of dealkylating catalysts such as sulfuric acid and aluminum chloride. However, these catalysts have been found objectionable in that they have considerable tendency to polymerize the olefins formed and to cause objectionable side reactions unless the conditions of temperature and pressure are maintained at relatively low levels. When the reaction conditions are thus restricted the reaction does not proceed as fast as is often desirable and the yields of the desired products may be relatively low. Thus, with the catalysts heretofore used in such dealkylation processes efficient operation is often impossible.

We have found that the alkyl esters of sulfuric acid are effective dealkylation catalysts and possess particular advantages over the catalysts heretofore known. When these alkyl esters of sulfuric acid are used as catalysts the reaction need not be so carefully controlled as in the case of the catalysts heretofore known. These esters are comparatively stable compounds and exhibit little tendency to cause formation of polymers or oxidation products, and when they are used as catalysts, the dealkylation reaction can be carried out more rapidly and more completely than is the case when other catalysts are employed and higher yields of purer products are obtained.

Another advantage in the use of the alkyl sulfuric acid esters as catalysts is that during the process certain of these esters, such as diethyl sulfate, cause an increase in the rate of dealkylation as the reaction proceeds. It is often advantageous therefore to use a mixture of an ester of this type with an ester which does not cause such an increase in rate or with which the rate of reaction decreases so as to obtain a more even distribution of iso-olefin evolution throughout the dealkylating reaction.

Thus by subjecting alkylated phenols containing branched-chain alkyl substituents having at least three carbon atoms to the action of alkyl esters of sulfuric acid at temperatures from 80° to 300° C., we have been able to effect dealkylation of the alkylated phenols with the production of substantially pure iso-olefin in good yield and without excessive polymerization of the iso-olefin so produced. We have obtained particularly good results in producing olefins containing from 3 to 6 carbon atoms by this method.

Both the mono- and di-alkyl esters of sulfuric acid may be used as dealkylating agents according to our invention. They are advantageously used in amounts equivalent to about 0.1 to 1.0 per cent of 95 per cent sulfuric acid. However, because of their high efficiency satisfactory results may be obtained with amounts as low as the equivalent of 0.05 per cent sulfuric acid, and because they have little or no tendency to cause polymerization or undesirable oxidation-reduction side reactions, they can be used in higher concentration, for example, the equivalent of 2.0 per cent or more of sulfuric acid. In order to effect satisfactory dealkylation with these dealkylating catalysts an elevated temperature is required. While some dealkylation is effected at temperatures as low as 80° C., temperatures of at least about 150° C. are usually required to carry out the reaction in a reasonable length of time.

Temperatures which approach the boiling point of the dealkylated phenol product are particularly advantageous in batch operation and in continuous operation higher temperatures may be used advantageously. In general, however, excessively high temperature above about 300° C. should be avoided because of possible undesirable side reactions. Too low temperatures are also undesirable because we have found that a decrease in temperature causes a decrease in the rate and extent of dealkylating action.

It is usually advantageous to conduct the dealkylation at atmospheric pressure, although superatmospheric pressures and subatmospheric pressures may be used in some instances. Working at atmospheric pressure, is of especial advantage where continuous operation is attempted. However working under some pressure is also advantageous in that the size of the equipment may be reduced and refrigeration is not required to liquefy and separate the evolved isobutylene. Forty-five pounds pressure will liquefy the isobutylene at room temperature. High pressures are to be avoided as they may cause reversal of the reaction. When it is desired to flash off the phenol formed during the reaction reduced pressure may be used but recovery of the isobutylene product then becomes more difficult.

The dealkylation operation can advantageously be conducted by heating the alkylated phenol with or without the use of reflux in the presence of a small amount of the dealkylating catalyst. Evolution of the olefin usually begins at about 80° to 100° C. and increases as the temperature rises. Heating is usually continued until the evolution of olefin ceases or until the boiling point of the residue indicates that dealkylation has proceeded to the desired point. Ordinarily, this will be the point of complete or substantially complete dealkylation of the alkylated phenol, but in special instances partial dealkylation may be effected. For example, a di-butylated cresol may be reduced to a mono-butylated cresol whenever it is desired to obtain the latter product.

It will be understood that in using the term "dealkylation" we are referred to a splitting off of relatively high alkyl groups that is to say alkyl substituents containing three or more carbon atoms, such as, isopropyl and tertiary butyl groups. Dealkylation in the contemplated manner does not split off such methyl or ethyl groups as are present. Thus it will not reduce a cresol to a phenol ($C_6H_5OH$). Furthermore, by the term "dealkylation catalysts," as used herein we mean alkyl esters of sulfuric acid such as ethyl hydrogen sulfate, di-ethyl sulfate, mono-secondary propyl sulfate, di-secondary propyl sulfate, mono-normal propyl sulfate, di-normal propyl sulfate, mono and di-normal butyl or mono and di-isobutyl sulfate, mono-secondary butyl sulfate, di-secondary butyl sulfate, mono-tertiary butyl sulfate, di-tertiary butyl sulfate, amyl sulfates and the like; these compounds, when used according to the method of our invention, will cause a splitting off of the relatively high alkyl groups, but will not decompose cresols, xylenols or ethyl phenols.

The mono- or di-secondary and tertiary butyl esters of sulfuric acid are particularly good dealkylating catalysts. The mono-tertiary butyl ester of sulfuric acid may be prepared in solution satisfactory for use directly as a dealkylating agent by saturating 63 per cent sulfuric acid solution with isobutylene, or by adding a suitable proportion of sulfuric acid to tertiary butyl alcohol. Similarly, a suitable solution of the mono-secondary butyl ester may be prepared by reacting concentrated sulfuric acid with a weighed mixture of butenes −1 and −2, or by mixing suitable proportions of sulfuric acid with secondary butyl alcohol. A solution of the normal butyl ester may be prepared by mixing sulfuric acid and normal butyl alcohol in the correct proportions. The di-secondary butyl ester may be synthesized, among other ways, by reacting sulfuryl chloride with secondary butyl alcohol according to the method of Bushong, Amer. Chem. Jour. 30, 212 (1903) or by the direct addition of 2 mols of butene −1 or −2 to one mol of concentrated sulfuric acid.

The tertiary butyl esters of sulfuric acid may be advantageously used in amounts equivalent to about 0.2 to 0.5 per cent of sulfuric acid. However, because of their high efficiency satisfactory results may be obtained with amounts as low as the equivalent of 0.05 per cent sulfuric acid, and because they have little or no tendency to cause polymerization or undesirable oxidation-reduction side reactions, they can be used in higher concentration; concentrations equivalent to 2.0 per cent or more of sulfuric acid. Dealkylation is most readily effected in the presence of tertiary butyl esters of sulfuric acid at temperatures ranging from 150° to 250° C. Temperatures as low as 80° C. may be used, but in such instances a longer period of time is required to carry out the reaction. The chief advantage in the use of the tertiary butyl esters of sulfuric acid as a catalyst is that the rate of iso-olefin evolution is greatly increased. This is probably due to the fact that the tertiary butyl ester of sulfuric acid is more readily soluble in the alkylated phenol, than is sulfuric acid itself.

The secondary butyl esters of sulfuric acid show all the advantages possessed by the tertiary butyl esters. They may be used in the same concentrations as the tertiary butyl esters, and the results obtained are practically the same as those when the tertiary butyl esters are used as catalysts.

In the following examples the effectiveness of various alkyl esters of sulfuric acid in liberating iso-olefins from alkylated phenols is specifically illustrated.

*Example I.*—9.821 g. of 2,6-di-tertiary-butyl-4-methyl phenol, just sufficient to give off 2000 cc. of isobutylene gas at standard temperature and pressure on complete debutylation, was placed into a reaction vessel. This was surrounded by a nitro-benzene vapor bath, which maintained the temperature at about 208° C. or just above the refluxing temperature of para-cresol, the phenolic end product of the dealkylation. When the 2,6-di-tertiary-butyl-4-methyl phenol had been brought to temperature a small vial containing diethyl sulfate in amount equivalent to 1.00 per cent of sulfuric acid was introduced into the reaction chamber, the entrance port was closed immediately and a timer was started. The isobutylene evolved was collected in a large bottle, immersed in a water bath, thermostatically controlled and held at 26° C. The bottle had been filled with water at the start of the run and with the aid of a manometer, the water was siphoned out of the bottle at the same rate at which the isobutylene was collected. The water was withdrawn into a measuring cylinder and the gas was collected at atmospheric pressure. At the end of 1800 seconds 79.0 per cent of the theoretical yield of isobutylene had been collected and after 3000 seconds a 100 per cent yield of iso-butylene had been obtained.

*Example II.*—The same procedure as in Example I was followed with the exception that the diethyl sulfate was used in amount equivalent to 0.5 per cent of sulfuric acid. At the end of 1800 seconds 41 per cent of the theoretical yield of isobutylene had been collected, and after 3000 seconds a yield of 100 per cent isobutylene was obtained. From a comparison of Examples I and II, it will be seen that while a smaller amount of catalyst gives a slower initial rate of reaction, the total reaction is completed in about the same time.

*Example III.*—Again following the procedure of Example I with the exception that the catalyst used was di-secondary butyl sulfate in amount equivalent to 0.44 per cent sulfuric acid a 100 per cent yield of isobutylene was obtained in less than 1800 seconds.

*Example IV.*—The same procedure was followed as in Example III with the exception that the amount of di-secondary butyl sulfate used was equivalent to 0.22 per cent sulfuric acid. Again 100 per cent isobutylene was collected in less than 1800 seconds.

*Example V.*—In this example the same procedure as that of Example III was followed, but the amount of di-secondary butyl sulfate used was equivalent to only 0.09 per cent sulfuric acid. In this test 72.6 per cent of isobutylene was collected in 1800 seconds and 92.5 per cent isobutylene was obtained at the end of 3000 seconds.

The results of these tests along with several experiments in which mono-tertiary butyl sulfate was used as the catalyst are summarized in the following Table I. By comparison of the results obtained in these tests it will be observed that by selection of a suitable catalyst and catalyst concentration a wide range of reaction velocities can be obtained which may be useful for particular purposes, such as when it is desired to stop the reaction when the alkylated phenol has been partially dealkylated.

Table I

*Dealkylation of 2,6-di-tertiary-butyl-4-methyl phenol*

| Catalyst | Percent equivalent of 95% H₂SO₄ | Time (seconds) required to collect the following theoretical percentages of isobutylene | | | | | Percent isobutylene collected | |
|---|---|---|---|---|---|---|---|---|
| | | 10% | 30% | 50% | 70% | 90% | 1,800 sec. | 3,000 sec. |
| Diethyl sulfate | 1.0 | 795 | 1,155 | 1,425 | 1,735 | 1,955 | 79.0 | 100.0 |
| Do | 0.5 | 1,110 | 1,610 | 1,960 | 2,230 | 2,645 | 41.0 | 100.0 |
| Di-secondary butyl sulfate | 0.44 | 62 | 131 | 221 | 387 | 660 | 100.0 | 100.0 |
| Do | 0.22 | 110 | 222 | 361 | 635 | 1,050 | 100.0 | 100.0 |
| Do | 0.09 | 320 | 627 | 965 | 1,685 | 2,810 | 72.6 | 92.5 |
| Mono-tertiary butyl sulfate | 1.00 | 20 | 63 | 131 | 280 | 750 | 96.5 | 97.5 |
| Do | 0.5 | 30 | 80 | 162 | 320 | 640 | 100.0 | 100.0 |
| Do | 0.2 | 110 | 200 | 350 | 620 | 1,020 | 100.0 | 100.0 |

*Example VI.*—24.8 grams (0.1 mol) of 2,6-ditertiary-amyl-4-methyl phenol was placed in a reaction vessel and heated to a temperature of 208° C. in a nitrobenzene vapor bath. A small vial containing 0.248 gram of di-sec-butyl sulfate was introduced into the reaction chamber. The trimethyl-ethylene evolved was condensed and collected. At the end of 1200 seconds 83.6 per cent of the theoretical yield of trimethyl ethylene had been collected; in 1800 seconds complete dealkylation had taken place.

Although the above examples are limited to batch operation, the process may be used continuously. In a continuous operation we prefer to operate at temperatures higher than 200° C.; we may use temperatures as high as 300° C. and may operate in the vapor phase. Thus in dealkylating alkylated cresols we advantageously operate at temperatures ranging from 225–230° C. By using this temperature range we find that the cresol is vaporized and carried away as liberated. This is advantageous for the cresol does not stay behind to dilute the reaction mixture. The ratio of catalyst to unreacted alkylated phenol remains high, and the rate of gas evolution is materially increased and held more constant during the entire dealkylation period.

The term sulfuric acid as used herein and in the appended claims is intended to refer to sulfuric acid of the usual commercial concentration of about 95.0 per cent.

What we claim is:

1. A process of producing mono-olefins and phenols comprising heating at a temperature of at least about 80° C. a mixture consisting essentially of alkylated phenol having at least one branched chain alkyl substituent and a small amount of an alkyl ester of sulfuric acid.

2. A process of producing mono-olefins and phenols comprising heating at a temperature of about 80° to 300° C. a mixture consisting essentially of alkylated phenol having at least one branched chain alkyl substituent and a small amount of an alkyl ester of sulfuric acid.

3. A process of producing mono-olefins and phenols comprising heating at a temperature of about 80° to 300° C. a mixture consisting essentially of alkylated phenol having at least one branched chain alkyl substituent and a small amount of an approximately equimolar mixture of an aliphatic alcohol and sulfuric acid.

4. A process of producing mono-olefins and phenols comprising heating at a temperature of about 80° to 300° C. a mixture consisting essentially of alkylated phenol having at least one branched chain alkyl substituent and an alkyl ester of sulfuric acid in an amount equivalent to 0.05 to 2.0 per cent of 95.0 per cent sulfuric acid.

5. A process of producing mono-olefins and phenols comprising heating at a temperature of about 80° to 300° C. a mixture consisting essentially of alkylated phenol having at least one branched chain alkyl substituent and an ethyl ester of sulfuric acid in an amount equivalent to 0.05 to 2.0 per cent of 95.0 per cent sulfuric acid.

6. A process of producing mono-olefins and phenols comprising heating at a temperature of about 80° to 300° C. a mixture consisting essentially of alkylated phenol having at least one branched chain alkyl substituent and a secondary butyl ester of sulfuric acid in an amount equivalent to 0.05 to 2.0 per cent of 95.0 per cent sulfuric acid.

7. A process of producing mono-olefins and phenols comprising heating at a temperature of about 80° to 300° C. a mixture consisting essentially of alkylated phenol having at least one branched chain alkyl substituent and a tertiary butyl ester of sulfuric acid in an amount equivalent to 0.05 to 2.0 per cent of 95.0 per cent sulfuric acid.

8. A process of producing mono-olefins and phenols comprising heating at a temperature of about 80° to 300° C. a mixture consisting essentially of alkylated phenol having at least one branched chain alkyl substituent and a mixture of an alkyl ester of sulfuric acid adapted to cause an increase in the rate of dealkylation as the reaction proceeds and an alkyl ester of sulfuric acid with which the rate of dealkylation decreases as the reaction proceeds.

9. A process of producing mono-olefins and phenols comprising heating at a temperature sufficient to cause dealkylation, a mixture consisting essentially of alkylated phenol having at least one branched chain alkyl substituent and a small amount of an alkyl ester of sulfuric acid under pressure sufficient to liquefy at room temperature the liberated mono-olefin.

DONALD R. STEVENS.
JOSEPH B. McKINLEY.